United States Patent
Bosch et al.

(10) Patent No.: US 6,811,825 B1
(45) Date of Patent: Nov. 2, 2004

(54) AQUEOUS DISPERSION COMPRISING POLYURETHANE-BASED RESINS AND WATER-INSOLUBLE CELLULOSE ESTER, METHODS FOR PREPARING AND USING SAME, AND ARTICLES COATED WITH SAME

(75) Inventors: Werner Bosch, Wuppertal (DE); Armin Göbel, Wetter (DE); Holger Schmidt, Wuppertal (DE); Bettina Vogt-Birnbrich, Solingen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/980,718

(22) PCT Filed: May 24, 2000

(86) PCT No.: PCT/EP00/04696

§ 371 (c)(1),
(2), (4) Date: Nov. 7, 2001

(87) PCT Pub. No.: WO00/73388

PCT Pub. Date: Dec. 7, 2000

(30) Foreign Application Priority Data

May 27, 1999 (DE) .......................................... 199 24 415

(51) Int. Cl.$^7$ ................................................ B05D 1/36
(52) U.S. Cl. ..................... 427/407.1; 427/409; 524/35; 524/591; 524/839
(58) Field of Search .................................. 524/589, 590, 524/591, 839, 840, 35, 36, 37, 38, 39, 40, 41; 525/123, 455; 427/407.1, 409; 428/411.1

(56) References Cited

U.S. PATENT DOCUMENTS

| | | | |
|---|---|---|---|
| 3,941,733 A | * 3/1976 | Chang | ........................ 524/838 |
| 4,306,998 A | * 12/1981 | Wenzel et al. | ................. 524/37 |
| 4,551,491 A | * 11/1985 | Panush | ........................ 524/31 |
| 5,342,882 A | * 8/1994 | Gobel et al. | ................. 524/832 |
| 5,384,163 A | 1/1995 | Budd et al. | |
| 5,520,963 A | 5/1996 | Liu | |

FOREIGN PATENT DOCUMENTS

| | | | |
|---|---|---|---|
| CA | 2056724 | 9/1992 | |
| EP | 069936 B1 | 3/1987 | |
| EP | 0490149 A | 6/1992 | |
| WO | WO-95/28429 A1 | * 10/1995 | ........... C08G/18/08 |
| WO | WO 97/49739 | 12/1997 | |
| WO | WO-97/49739 A1 | * 12/1997 | ......... C08F/251/02 |

* cited by examiner

Primary Examiner—Shrive P. Beck
Assistant Examiner—William Phillip Fletcher, III
(74) Attorney, Agent, or Firm—Steven C. Benjamin

(57) ABSTRACT

Aqueous binder dispersion which is suitable for the preparation of coating compositions for multilayer lacquerings and is based on polyurethane resins, which can be (meth) acrylated, the optionally (meth)acrylated polyurethane dispersion particles comprising 0.5 to 5 wt. %, based on their solids content, of water-insoluble cellulose esters.

6 Claims, No Drawings

AQUEOUS DISPERSION COMPRISING POLYURETHANE-BASED RESINS AND WATER-INSOLUBLE CELLULOSE ESTER, METHODS FOR PREPARING AND USING SAME, AND ARTICLES COATED WITH SAME

BACKGROUND OF THE INVENTION

The invention relates to aqueous binder dispersions for aqueous coating compositions based on polyurethanes, which can be (meth)acrylated, comprising water-insoluble cellulose esters. It also relates to processes for their preparation and processes for multilayer lacquering using the coating compositions, in particular as a water-based lacquer in processes for the production of decorative multilayer lacquerings of the water-based lacquer/clear lacquer type.

Base lacquers which are based on organic solvents, comprise cellulose esters, such as cellulose acetobutyrate, and are suitable for the production of decorative multilayer lacquerings of the base lacquer/clear lacquer type are known. Cellulose esters impart particular rheological properties to base lacquers based on organic solvents, and in the case of effect base lacquers these lead to a favourable enhancement of the effect within the finished two-layer effect lacquering.

Water-based lacquers comprising water-insoluble cellulose esters are known from EP-A-0 069 936 and from WO 97/49739. EP-A-0 069 936 describes dispersions of cellulose esters in water which are suitable as binders in water-based lacquers and are prepared by copolymerization of a mixture of a water-soluble resin from the group consisting of polyester resins, acrylic resins and alkyd resins and alpha,beta-ethylenically unsaturated monomers in the presence of the dissolved cellulose esters, the cellulose ester content, based on the total solids content of the dispersion, being between 5 and 40%. WO 97/49739 describes dispersions which are suitable as binders in water-based lacquers and comprise at least 5 wt. %, preferably 10 to 30 wt. % of cellulose esters, based on the resin solids of the dispersion, the dispersions being those which are based on vinyl polymers and are prepared by copolymerization of previously prepared aqueous emulsions of cellulose esters dissolved in a mixture of vinyl monomers. The vinyl monomers here include polyunsaturated vinyl monomers.

The water-based lacquers of the prior art comprising water-insoluble cellulose esters have a low processing solids content compared with corresponding water-based lacquers comprising no water-insoluble cellulose esters. It has furthermore been found that the cellulose esters contained in the known base lacquer layers weaken the weathering resistance of base lacquer/clear lacquer two-layer lacquerings.

BRIEF SUMMARY OF THE INVENTION

The object of the invention is to provide aqueous coating compositions which have a rheologically active content of cellulose esters, do not have the above disadvantages and are suitable in particular for multilayer lacquerings, in particular for producing colour- and/or effect-imparting base lacquer layers.

DETAILED DESCRIPTION OF THE INVENTION

The object is achieved if the aqueous dispersions, provided by the invention, of polyurethane resins, which can be (meth)acrylated, are used as binders in aqueous coating compositions, the optionally (meth)acrylated polyurethane dispersions comprising 0.5 to 5 wt. %, preferably to below 5wt. % of water-insoluble cellulose esters, based on the dispersion solids. It was in no way to be expected that the binder dispersions according to the invention, with their low contents of 0.5 to 5 wt. % of water-insoluble cellulose esters in the optionally (meth)acrylated polyurethane dispersion particles, have the rheological properties according to the object in aqueous coating compositions.

The invention also provides aqueous coating compositions which comprise aqueous binder dispersions based on polyurethane resins, which can be (meth)acrylated, and which are characterized in that the optionally (meth)acrylated polyurethane dispersions particles comprise 0.5 to 5 wt. %, based on their solids content, of water-insoluble cellulose esters.

The optionally (meth)acrylated polyurethane dispersion particles comprise water-insoluble cellulose esters to the extent of 0.5 to 5 wt. %, preferably to below 5 wt. %, and optionally (meth)acrylated polyurethane resin to the extent of 95 (preferably above 95) to 99.5 wt. %.

The aqueous coating compositions according to the invention comprise one or more aqueous binder dispersions based on polyurethane resins A) and/or (meth)acrylated polyurethane resins B) with a content of 0.5 to 5 wt. %, preferably to below 5 wt. %, of water-insoluble cellulose esters, based on the dispersion solids.

The aqueous binder dispersions are either dispersions of polyurethane resins A), which are in each case mixed with a corresponding amount of water-insoluble cellulose ester before the addition of considerable amounts of water for the purpose of conversion into the disperse phase and are then converted into the disperse phase by addition of water, or they are dispersions of (meth)acrylated polyurethane resins B), which are mixed with a corresponding amount of water-insoluble cellulose ester before or after their (meth)acrylation, but in any case still before the addition of considerable amounts of water for the purpose of conversion into the disperse phase, and are then converted into the disperse phase by addition of water. The dispersions of (meth)acrylated polyurethane resins B) can be prepared here by (meth)acrylating the polyurethane resins in the non-aqueous phase, subsequently mixing them with a corresponding amount of water-insoluble cellulose ester and then converting them into the disperse phase by addition of water, or by mixing them with a corresponding amount of water-insoluble cellulose ester in the non-aqueous phase, subsequently (meth)acrylating them and then converting them into the disperse phase by addition of water. Preferably, however, the polyurethane resins are mixed with a corresponding amount of water-insoluble cellulose ester in a non-aqueous phase, subsequently converted into the disperse phase by addition of considerable amounts of water and then (meth)acrylated in the aqueous dispersion. The term "(meth)acrylation" means that a free-radical polymerization of (meth)acrylically unsaturated monomers is carried out in the presence of polyurethane resins for the preparation of the (meth)acrylated polyurethane resins B).

If the water-insoluble cellulose esters are only inadequately miscible with the polyurethane resins A) still present in anhydrous form or with the polyurethane resins which are to be (meth)acrylated and are still present in anhydrous form or are only inadequately soluble therein, it is expedient to mix the water-insoluble cellulose esters in the form of an organic solution with the polyurethane resins still present in anhydrous form. The water-insoluble cellulose esters are, for example, cellulose acetopropionate or cellulose acetobutyrate, which are available commercially, for example by Eastman, in various water-insoluble variants with different hydroxyl, acetyl and propionyl or butyryl contents. Cellulose acetobutyrate, in particular with high butyryl contents of between 35 and 55 wt. %, is preferred. Organic solutions of the water-insoluble cellulose esters which can be employed are, for example, those with a content of 20 to 60 wt. % of cellulose ester in polar organic, preferably water-miscible solvents. Examples of solvents which can be used are esters, glycol ethers, glycol ether esters, glycol esters, ketones and N-alkylpyrrolidones. Butylglycol and N-methylpyrrolidone are preferred. After the formation of the dispersion, the solvent or solvents can be removed in part or completely, if desired, for example by distillation, optionally under reduced pressure. In the case of the polyurethane resins to be (meth)acrylated, it may also be expedient to use some or all of the amount of olefinically unsaturated monomers employed for the (meth)acrylation as the solvent for the water-insoluble cellulose esters. The olefinically unsaturated monomers can be employed here as the sole solvent or as a mixture with organic solvents.

It is expedient to ensure that the addition and the mixing with water-insoluble cellulose ester still takes place in a suitable process section before the addition of considerable amounts of water, for example such that interfering side reactions of the water-insoluble cellulose esters or of the water-insoluble cellulose esters dissolved in organic solvents and/or in olefinically unsaturated monomers with other constituents of the (reaction) mixture are ruled out. For example, a gel formation is to be avoided in particular. The choice of water-insoluble cellulose esters and optionally of the organic solvent and/or the olefinically unsaturated monomers can accordingly be made in the particular individual case.

The polyurethane resins A) are, for example, carboxy-functional polyurethane prepolymers A1) which are free from isocyanate groups or, preferably, carboxy-functional polyurethane prepolymers which are chain-lengthened in any desired manner to give polyurethane resins A2), and are in each case mixed with a corresponding amount of water-insoluble cellulose ester before the addition of considerable amounts of water for the purpose of conversion into the disperse phase. The term "free from isocyanate groups" used here and below means "free from isocyanate groups" and includes "substantially free from isocyanate groups", for example the term "carboxy-functional polyurethane prepolymers which are free from isocyanate groups" also includes carboxy-functional polyurethane prepolymers with a residual isocyanate group content corresponding to an NCO number, based on the solid resin, of 0.5% and less.

The preparation of carboxy-functional polyurethane prepolymers A1) which are free from isocyanate groups can be carried out, for example, by:

1) preparation of a linear or branched, non-gelled polyurethane prepolymer which contains carboxyl groups and is isocyanate-functional in an organic solvent or in the absence of solvents,
2) reaction of the free isocyanate groups of the polyurethane prepolymer, optionally after partial or complete neutralization thereof and conversion into the aqueous phase, with one or more monofunctional compounds which are capable of addition with respect to isocyanate groups, such as, for example, monoalcohols and/or primary or secondary monoamines.

In this case, as mentioned above, in a suitable process section, for example after the reaction of the free isocyanate groups with the monofunctional compounds which are capable of addition with respect to isocyanate groups, a corresponding amount of water-soluble cellulose ester is added to the polyurethane prepolymer and mixed homogeneously therewith still before the addition of considerable amounts of water for the purpose of formation of a dispersion.

The preparation of the linear or branched, non-gelled polyurethane prepolymers which contain carboxyl groups and are isocyanate-functional which takes place in process step 1) can be carried out, for example, by reaction of one or more compounds having at least two groups which are reactive towards isocyanate, in particular one or more polyols, preferably diols, with one or more organic polyisocyanates, preferably diisocyanates, and with one or more compounds having more than one, preferably two, groups which are reactive towards isocyanate groups and at least one carboxyl group.

For example, a branched, but preferably linear, polyurethane prepolymer which contains lateral and/or terminal NCO groups and can be used as the starting substance can be prepared by reaction in an anhydrous medium of a1) at least one linear or branched compound which carries at least two groups which are reactive towards isocyanate, for example with a weight-average molecular weight (Mw) of 60 to 10,000, preferably 60 to 6,000, with a2) at least one organic polyisocyanate, in particular diisocyanate, and a3) at least one compound with more than one group which is reactive with isocyanate and at least one carboxyl group, for example with a number-average molecular weight (Mn) of up to 10,000, preferably up to 2,000, in an NCO/OH ratio of more than 1 to 4:1, preferably 1.1 to 2:1, particularly preferably 1.1 to 1.7:1.

The abovementioned linear or branched compound of component a1) is preferably at least one polyol based on one or more polyethers, polyesters and/or polycarbonate with at least two OH groups in the molecule and a number-average molecular weight (Mn) of 600 to 10,000, preferably above 1,000 and below 6,000, optionally with the co-use of one or more at least difunctional low molecular weight alcohols and/or amines and/or amino-alcohols with a molecular weight of below 600, preferably below 400.

Any desired organic polyisocyanates, such as e.g. diisocyanates, can be employed as component a2). Aliphatic, cycloaliphatic, aromatic or araliphatic diisocyanates can be employed. Examples of suitable diisocyanates are hexane diisocyanate, isophorone diisocyanate, bis-(4-isocyanatocyclohexyl)methane, bis-(4-isocyanatophenyl)-methane, tetramethylxylylene diisocyanate and 1,4-cyclohexane diisocyanate.

Low molecular weight compounds which contain more than one, preferably two or at least two, groups which react with isocyanate groups and at least one carboxyl group can preferably be used as component a3). Suitable groups which react with isocyanate groups are, in particular, hydroxyl groups and primary and secondary amino groups. The carboxyl groups can be introduced, for example, by using hydroxyalkanecarboxylic acids as component a3). Dihydroxyalkanoic acids, in particular alpha,alpha-dimethylolalkanoic acids, such as alpha,alpha-dimethylolpropionic acid, are preferred.

The carboxy-functional polyurethane resins A2) can be, for example, aqueous polyurethane dispersions A2 a), which can be prepared by chain lengthening, with polyisocyanates, of polyurethane prepolymers which are reactive towards polyisocyanates and contain active hydrogen and carboxyl groups.

In this case, as explained above, in a suitable process section, for example before or after the reaction of the reactive groups of the polyurethane prepolymer which contain active hydrogen with chain-lengthening polyisocyanate, a corresponding amount of water-insoluble cellulose ester is added to the polyurethane prepolymer or to the already chain-lengthened polyurethane resin A2 a) and mixed homogeneously therewith still before the addition of considerable amounts of water for the purpose of formation of a dispersion.

However, the carboxy-functional polyurethane resins A2) are preferably aqueous polyurethane dispersions A2 b), which can be prepared by chain lengthening of isocyanate- and carboxy-functional polyurethane prepolymers with polyamines, hydrazine (derivatives), water and/or polyols.

In this case, as explained above, in a suitable process section, for example before or after the reaction of the isocyanate groups of the polyurethane prepolymer with chain-lengthening agents, a corresponding amount of water-insoluble cellulose ester is added to the polyurethane prepolymers or to the already chain-lengthened polyurethane resin A2 b) and mixed homogeneously therewith still before the addition of considerable amounts of water for the purpose of formation of a dispersion.

The preparation of the polyurethane resins A2 b) can be carried out, for example, by:

1) preparation of a linear or branched, non-gelled polyurethane prepolymer which contains carboxyl groups and is isocyanate-functional in an organic solvent or in the absence of solvents, 2) reaction of the free isocyanate groups of the polyurethane prepolymer, optionally after partial or complete neutralization thereof and conversion into the aqueous phase, with one or more compounds which are capable of addition with respect to isocyanate groups and effect a chain lengthening, chosen from polyamines, hydrazine (derivatives), water and/or polyols.

In this case, the amounts of the individual educts can be chosen, for example, and the reaction can be carried out, for example, such that the finished polyurethane resin A2b) has a number-average molecular weight (Mn) of 2,500 to 1,000,000, a hydroxyl number of 0 to 100 mg KOH/g, based on the solid resin, and an acid number of 5 to 60, preferably to 40 mg KOH/g, based on the solid resin.

For process step 1), the same applies here as described above for process step 1) in the preparation of the polyurethane prepolymers A1).

The isocyanate- and carboxy-functional polyurethane prepolymer obtained in process step 1) is chain-lengthened in process step 2) by reaction of the free isocyanate groups with one or more compounds which are capable of addition with respect to isocyanate groups and effect a chain lengthening, chosen from polyamines, hydrazine (derivatives), water and/or polyols. In the case of water, the chain lengthening is effected by hydrolysis of NCO groups to $NH_2$ groups and spontaneous addition thereof on to NCO groups. The reaction of the free isocyanate groups with one or more compounds which are capable of addition with respect to isocyanate groups and effect a chain lengthening can be carried out before conversion of the isocyanate- and carboxy-functional polyurethane prepolymer obtained in process step 1) in to an aqueous dispersion. Except for in the case of water as the chain-lengthening agent, however, the chain lengthening is preferably carried out in parallel with or after the conversion into an aqueous dispersion.

Aqueous polyurethane dispersions A2c) which can be prepared by chain lengthening of alkoxy- or acyloxysilane- and carboxy-functional polyurethane prepolymers with the addition of water are also preferred carboxy-functional polyurethane resins A2).

In this case, as explained above, in a suitable process section, for example before or after the chain lengthening of the alkoxy- or acyloxysilane-functional polyurethane prepolymer, a corresponding amount of water-insoluble cellulose ester is added to the polyurethane prepolymer or to the already chain-lengthened polyurethane resin A2c) and mixed homogeneously therewith still before the addition of considerable amounts of water for the purpose of formation of a dispersion.

The polyurethane resins A2c) prepared by chain lengthening of alkoxy- or acyloxysilane- and carboxy-functional polyurethane prepolymers with the addition of water have, for example, a number-average molecular weight (Mn) of 2,500 to 1,000,000, a content, for example, of 2 to 150 mmol, preferably 3 to 100 mmol, particularly preferably 7 to 70 mmol of siloxane bridges (—Si—O—Si—) per 100 g of solid resin, a hydroxyl number of 0 to 100, preferably 0 to 60 mg KOH/g, based on the solid resin, and an acid number of 5 to 60, preferably 10 to 40 mg KOH/g, based on the solid resin. The polyurethane resins A2c) can be linear or branched in structure or be in the form of microgels.

The polyurethane resins A2c) chain-lengthened to form siloxane bridges can be prepared, for example, by subjecting a polyurethane prepolymer which contains carboxyl groups, has at least one R'OSi group, wherein R'=C1- to C8-alkyl or C(O)R''' and R'''=C1- to C10-alkyl and can be present in the presence of an organic solvent, to a chain lengthening by adding water in at least the stoichiometric amount for hydrolysis of the R'OSi groups and converting the reaction product into an aqueous dispersion during or after the chain lengthening, optionally after complete or partial neutralization.

The preparation of the polyurethane prepolymers with R'OSi groups can be carried out, for example, by:

1) preparation of a linear or branched, non-gelled polyurethane prepolymer which contains carboxyl groups and is isocyanate-functional in an organic solvent or in the absence of solvents, 2) reaction of the free isocyanate groups of the polyurethane prepolymer with one or more compounds of the general formula

$$((H-X-)_n R)_a Si(OR')_b (R'')_c \quad (I)$$

where X=O, S, NH or NR'''', preferably NH or NR'''', R=a bifunctional, trifunctional or tetrafunctional, preferably bifunctional, organic radical with a molecular weight of 13 to 500, preferably (Ar) alkylene having 1 to 12 C atoms, particularly preferably alkylene having 1 to 12 C atoms, R'=C1- to C8-alkyl or C(O)R''', preferably C1- to C4-alkyl, R''=R'''=C1- to C10-alkyl, where R' and R''' can be identical or different, R''''=C1- to C8-alkyl, a=1, 2 or 3, preferably 1, b=1, 2 or 3, preferably 2 or 3, c=0, 1 or 2 and n=1 to 3, preferably 1 or 2, particularly preferably 1, where several radicals R', R'' and R''' are identical or different and wherein the sum of a plus b plus c is four, optionally as a mixture with one or more alkanolamines which carry $NH_2$ and/or NH groups and have an OH functionality of at least 1.

For process step 1), the same applies here as described above for process step 1) in the preparation of the polyurethane prepolymers A1).

Some preferred examples of compounds of the general formula (I) which may be mentioned are betaaminoethyltriethoxysilane, gamma-aminopropyltrimethoxysilane and delta-aminobutyltriethoxysilane.

The reaction of the NCO-functional polyurethane prepolymer to give the R'OSi-functionalized polyurethane prepolymer takes place with complete consumption of the HX groups of the compounds of the general formula (I). Preferably, isocyanate groups and HX groups are reacted with one another stoichiometrically in the ratio of 1:1. Any residual free isocyanate groups still remaining in the polyurethane prepolymer obtained in this way can be reacted with the usual compounds which are capable of addition with respect to isocyanate and contain active hydrogen, for example monoalcohols, diols, polyols, glycol ethers, monoamines, diamines, polyamines and hydrazine (derivatives), before conversion of the prepolymer into the aqueous phase.

The polyurethane resin A2c) on which the polyurethane dispersion is based can have hydroxyl groups. If this is desired, the polyurethane prepolymer containing NCO groups can be reacted in the preparation of the R'OSi-functionalized polyurethane prepolymer with at least one compound of the general formula (I) and with at least one alkanolamine which carries $NH_2$ and/or NH groups and has an OH functionality of at least 1. The reaction is carried out with complete consumption of the HX groups of the compounds of the general formula (I) and of the NH groups of the alkanolamine. The isocyanate groups of the NCO-functional polyurethane prepolymer are preferably reacted in a stoichiometric ratio with the HX groups of the compounds of the general formula (I) and the NH groups of the alkanolamine. The alkanolamine and the compound of the general formula (I) can be reacted here as a mixture or successively with the NCO-functional polyurethane prepolymer.

The alkanolamines which carry $NH_2$ and/or NH groups and have an OH functionality of at least 1 are compounds which can serve as donors of hydroxyl groups in the polyurethane resin dispersion A2c). The NH or $NH_2$ groups of the alkanolamines show a significantly higher reactivity with respect to the isocyanate groups of the NCO-functional polyurethane prepolymer compared with their OH groups. Examples of suitable alkanolamines with an OH functionality of at least 1 are monoalkanolamines and dialkanolamines, e.g. diethanolamine, N-methylethanolamine, diisopropanolamine, monoisopropanolamine, ethanolamine and 3-aminopropanol.

It may be expedient, if one or more aliphatic C4-C36-alcohols and/or -amines are also employed instead of or together with the alkanolamines which carry $NH_2$ and/or NH groups, for the reaction thereof as a rule to take place with complete consumption of their OH, NH and/or $NH_2$ groups. Fatty amines and/or fatty alcohols having more than 12 C atoms are preferred.

The R'OSi- and carboxy-functional, optionally neutralized polyurethane prepolymer is subjected to hydrolysis and as a consequence thereof chain lengthening. The total amount of water necessary for the preparation of the dispersion can be used for the hydrolysis and the chain lengthening thereby caused. The R'OSi groups of the polyurethane prepolymer are sensitive to hydrolysis. The course of the addition of water can be used to control the polyurethane resin A2c) to contain silicon in the form of siloxane this, the hydrolysis is preferably carried out initially with a small amount of water which is not sufficient for conversion into the aqueous phase, preferably up to ten times the stoichiometric excess, particularly preferably up to five times the stoichiometric excess, calculated with respect to the amount of water necessary for hydrolysis of the R'OSi groups. The hydrolysis of the R'OSi groups proceeds rapidly. The HOSi groups formed by hydrolysis condense to form siloxane bridges, water being split off, and thus lead to a chain-lengthened polyurethane A2c) with an increased molecular weight. Linear, branched or crosslinked products which are practically free from R'OSi and/or HOSi groups are obtained here, depending on the R'OSi-functionalized polyurethane prepolymer employed.

The conversion of the polyurethane resin, which is solvent-free or in organic solution, into an aqueous dispersion which takes place by addition of a sufficient amount of water can be carried out during or after conclusion of the chain lengthening by the formation of siloxane bridges. The chain lengthening proceeds in the resin phase; that is to say, if the resin is already dispersed by addition of a sufficient amount of water, the chain lengthening proceeds in the dispersion particles themselves.

The (meth)acrylated polyurethane resins B) are carboxy-functional hybrid polymers which can be prepared, for example, by free-radical polymerization of (meth)acrylically and optionally further olefinically unsaturated monomers in the presence of carboxy-functional polyurethane resins, preferably in the presence of carboxy-functional polyurethane resins in aqueous dispersion. The carboxy-functional polyurethane resins can contain olefinic double bonds or can be free from these.

In this case, as explained above, in a suitable process section, for example before or after conclusion of the synthesis of the polyurethane resin to be (meth)acrylated, a corresponding amount of water-soluble cellulose ester is added to the polyurethane resin and mixed homogeneously therewith still before the addition of considerable amounts of water for the purpose of formation of a dispersion. The (meth)acrylation as such can be carried out before or, preferably, after the addition of the considerable amounts of water. In this case, in the preparation of (meth)acrylated polyurethane resins B), the water-insoluble cellulose esters can also be used as a solution in some or in all of the amount of olefinically unsaturated monomers employed for the (meth)acrylation. The olefinically unsaturated monomers can be used here as the sole solvent or as a mixture with organic solvents.

The hybrid polymers prepared by polymerization of (meth)acrylically unsaturated monomers in the presence of carboxy-functional polyurethane resins, preferably in the presence of carboxy-functional polyurethane resins in aqueous dispersion, are, for example, polyurethane/poly(meth)acrylate polymer hybrids with a weight ratio of polyurethane content to poly(meth)acrylate content of 0.05:1 to 50:1, preferably up to 10:1, a hydroxyl number of 0 to 150, preferably below 100 mg KOH/g, based on the solid resin, and an acid number of 1.5 to 60 mg KOH/g, preferably 3 to 40 mg KOH/g, based on the solid resin. The carboxyl groups are preferably a constituent of the polyurethane content to the extent of at least 70%, particularly preferably exclusively.

The hybrid polymers prepared by polymerization in the presence of polyurethane resins containing olefinic double bonds either are linear block polymers or have a branched structure, for example as a comb polymer, or they are in the form of microgels. They have, for example, a number-average molecular weight (Mn) of 8,000 to 1,500,000 and can have a content of up to 100 mmol of silicon per 100 g of solid resin in the form of siloxane bridges (—Si—O—Si—) bonded in the polyurethane part.

The hybrid polymers prepared by polymerization in the presence of polyurethane resins which are free from olefinic double bonds comprise polyurethane and poly(meth) acrylate contents. The polyurethane and poly(meth)acrylate content can be present here as an inter-penetrating network, and/or the poly(meth)acrylate content is grafted on to the polyurethane content. The hybrid polymers prepared by polymerization in the presence of polyurethane resins which are free from olefinic double bonds can have, for example, a content of up to 100 mmol of silicon per 100 g of solid resin in the form of siloxane bridges (—Si—O—Si—) bonded in the polyurethane part.

The olefinically unsaturated monomers which undergo the polymerization in the build-up of the poly(meth)acrylate content of the polyurethane/poly(meth)acrylate polymer hybrids B) can be allylically or vinylically unsaturated monomers, in addition to the (meth)acrylically unsaturated monomers. Based on the olefinic double bonds undergoing the polymerization, the content of allylic or vinylic double bonds is preferably below 10%, and the content of (meth) acrylic double bonds is at least 50%, preferably more than 70%.

Examples of olefinically unsaturated monomers which can be polymerized by free radicals and can be used for the preparation of the polyurethane/poly(meth)acrylate polymer hybrids B) are those which carry no functional groups. Examples are (cyclo)alkyl (meth)acrylates, such as, for example, methyl (meth)acrylate, ethyl (meth)acrylate, propyl (meth)acrylate, butyl (meth)acrylate, hexyl (meth) acrylate, cyclohexyl (meth)acrylate, ethylhexyl (meth) acrylate, dodecyl (meth)acrylate, lauryl (meth)acrylate and isobornyl (meth)acrylate, and monovinylaromatic compounds, preferably having 8 to 10 carbon atoms per molecule, such as styrene and vinyltoluene; vinyl ethers and vinyl esters, such as vinyl acetate and vinyl versatate; and maleic, fumaric and tetrahydrophthalic acid dialkyl esters.

In addition to the non-functional monomers, olefinically unsaturated monomers with functional groups can also be employed. Examples are those with CH-acid, epoxide, hydroxyl or carboxyl groups, carboxy-functional monomers preferably contributing to the acid number of the polyurethane/poly(meth)acrylate polymer hybrid binder B) to the extent of no more than 30%.

Examples of olefinically unsaturated monomers with hydroxyl groups which, by themselves or together with any hydroxyl groups from the polyurethane content, can contribute towards the hydroxyl number of the hybrid polymer B) are allyl alcohol, but in particular hydroxyalkyl (meth) acrylates, such as hydroxyethyl (meth)acrylate or hydroxypropyl (meth)acrylate, or butanediol mono(meth)acrylate glycerol mono(meth)acrylate, adducts of (meth)acrylic acid on monoepoxides, such as e.g. versatic acid glycidyl ester, or adducts of glycidyl (meth)acrylate on monocarboxylic acids, such as e.g. acetic acid or propionic acid.

Examples of olefinically unsaturated monomers containing carboxyl groups are unsaturated carboxylic acids, such as e.g. (meth)acrylic, itaconic, crotonic, isocrotonic, aconitic, maleic and fumaric acid, and half-esters of maleic and fumaric acid.

Small contents of monomers with at least two polymerizable, olefinic double bonds can furthermore also be employed. The content of these monomers is preferably below 5 wt. %, based on the total weight of the monomers. Examples of such compounds are divinylbenzene, hexanediol di(meth)acrylate, ethylene glycol di(meth)acrylate, butanediol di(meth)acrylate, trimethylolpropane tri(meth) acrylate and similar compounds.

The aqueous binder dispersions based on polyurethane/ poly(meth)acrylate polymer hybrids B) can preferably be prepared, for example, by converting a polyurethane prepolymer which contains carboxyl groups, has on average 0.1 to 2 olefinically unsaturated groups per molecule which are accessible to free-radical polymerization or is free from olefinic double bonds, can have on average up to 9, for example 0.7 to 9 R'O groups per molecule bonded to silicon, wherein R'=C1- to C8-alkyl or C(O)R''' and R'''=C1- to C10-alkyl and can be present as a solution in a solvent which is inert towards isocyanate, into an aqueous dispersion by addition of water, optionally after prior neutralization of the carboxyl groups, and thereafter subjecting it to a free-radical polymerization together with olefinically unsaturated monomers. The olefinically unsaturated monomers here can be added before and/or after preparation of the aqueous dispersion. For example, the olefinically unsaturated monomers or a portion thereof can assume the function of a solvent which is inert towards isocyanate, and which does not have to be removed again, before the preparation of the aqueous dispersion.

The preparation of the polyurethane prepolymers which contain carboxyl groups and have optionally on average 0.1 to 2 lateral and/or terminal olefinically unsaturated groups per molecule which are accessible to free-radical polymerization and optionally on average 0.7 to 9 R'O groups per molecule, preferably bonded to lateral and/or terminal silicon, is preferably carried out by:

1) preparation of a linear or branched, non-gelled polyurethane prepolymer which is free from olefinic double bonds, contains carboxyl groups and is isocyanate-functional in an inert organic solvent (mixture) and/or in one or more olefinically unsaturated monomers which are inert towards isocyanate and are present as a mixture or in the absence of solvents and olefinically unsaturated monomers, 2 a) reaction of the free isocyanate groups of the polyurethane prepolymer obtained in 1)

a1) with one or more compounds of the general formula (I) as described above for the preparation of polyurethane resins A2) chain-lengthened by siloxane bridges, a2) optionally with one or more olefinically unsaturated monomers which are capable of addition on to isocyanate groups, a3) optionally with one or more alkanolamines which carry $NH_2$ and/or NH groups and have an OH functionality of at least 1, a4) optionally with one or more aliphatic C4-C36-alcohols and/or -amines, or 2b) reaction of the free isocyanate groups of the polyurethane prepolymer obtained in 1)

b1) optionally with one or more olefinically unsaturated monomers which are capable of addition on to isocyanate groups, b2) optionally with one or more alkanolamines which carry $NH_2$ and/or NH groups and have an OH functionality of at least 1, and b3) optionally with one or more aliphatic C4-C36-alcohols and/or amines.

For process step 1), the same applies here as described above for process step 1) in the preparation of the polyurethane prepolymers A1), it being possible for the isocyanate-functional polyurethane prepolymer here to be prepared in an inert organic solvent (mixture) and/or in one or more olefinically unsaturated monomers which are inert towards isocyanate and are present as a mixture or in the absence of solvents and olefinically unsaturated monomers.

The polyurethane prepolymer containing NCO groups obtained in process step 1) is reacted in process step 2 a)

- a1) with one or more compounds of the general formula (I),
- a2) optionally with one or more olefinically unsaturated monomers which are capable of addition on to isocyanate groups,
- a3) optionally with one or more alkanolamines which carry $NH_2$ and/or NH groups and have an OH functionality of at least 1, and
- a4) optionally with one or more aliphatic C4-C36-alcohols and/or -amines to give a polyurethane prepolymer which contains carboxyl groups, is R'OSi-functionalized and contains olefinic double bonds or is free from olefinic double bonds.

In respect of the compounds of the general formula (I), the same applies as described above.

The olefinically unsaturated monomers which are capable of addition on to isocyanate groups and are employed in the optional process step a2) are compounds with active hydrogen and with preferably only one polymerizable olefinic double bond in the molecule. Active hydrogen is contained, for example, in hydroxyl groups, NH groups, $NH_2$ groups or mercaptan groups. Compounds with active hydrogen in the form of hydroxyl groups, preferably with only one hydroxyl group, and with a polymerizable olefinic double bond in the molecule, in particular in the form of a (meth)acryloyl group, are preferred. Examples of such compounds are allyl alcohol, but in particular hydroxyalkyl (meth)acrylates, such as hydroxyethyl (meth)acrylate, hydroxypropyl (meth) acrylate or butanediol mono(meth)acrylate, glycerol mono (meth)acrylate, adducts of (meth)acrylic acid on monoepoxides, such as e.g. versatic acid glycidyl ester, and adducts of glycidyl (meth)acrylate on monocarboxylic acids, such as e.g. acetic acid or propionic acid.

The reaction of the NCO-functional polyurethane prepolymer to give the R'OSi-functionalized polyurethane prepolymer is carried out with complete consumption of the HX groups of the compounds I and preferably also of the groups which are reactive towards isocyanate in the olefinically unsaturated monomers optionally employed.

The polyurethane/poly(meth)acrylate hybrid polymer B) can have hydroxyl groups. For this, the polyurethane prepolymer containing NCO groups can be reacted in the preparation of the R'OSi-functionalized polyurethane prepolymer in the context of the optional process step a3) with at least one alkanolamine which carries $NH_2$ and/or NH groups and has an OH functionality of at least 1. The reaction then takes place with complete consumption of the $NH_2$ and/or NH groups of the alkanolamine.

The alkanolamines which carry $NH_2$ and/or NH groups and have an OH functionality of at least 1 are compounds which can serve as donors of hydroxyl groups and, by themselves or together with any hydroxyl groups from the polymer content, contribute towards the hydroxyl number of B).

It may be expedient if, instead of or together with the alkanolamines which carry $NH_2$ and/or NH groups, one or more aliphatic C4-C36-alcohols and/or -amine are also employed in the optional process step a4), reaction thereof then as a rule taking place with complete consumption of their OH, NH and/or $NH_2$ groups.

Residual free isocyanate groups which may still remain in the polyurethane prepolymer can be reacted with the usual compounds which are capable of addition with respect to isocyanate and contain active hydrogen, before conversion of the prepolymer into the aqueous phase.

The R'OSi- and carboxy-functional, optionally neutralized polyurethane prepolymer is subjected to hydrolysis, and as a consequence thereof chain lengthening. The corresponding explanations given above in connection with the preparation of the polyurethane resins A2c) apply here.

Instead of the reactions according to process step 2a), the polyurethane prepolymer containing NCO groups obtained in process step 1) can also be reacted according to process step 2b)

- b1) optionally with one or more olefinically unsaturated monomers which are capable of addition on to isocyanate groups,
- b2) optionally with one or more alkanolamines which carry $NH_2$ and/or NH groups and have an OH functionality of at least 1,
- b3) optionally with one or more aliphatic C4-C36-alcohols and/or -amines to give a polyurethane prepolymer which contains carboxyl and NCO groups and contains olefinic double bonds or is free from olefinic double bonds, and subsequently, after partial or complete neutralization and conversion into the aqueous phase, chain-lengthened with one or more compounds which are capable of addition with respect to isocyanate groups and effect chain lengthening, chosen from polyamines, hydrazine (derivatives), water and/or polyols, to give a polyurethane resin which contains carboxyl groups and contains olefinic double bonds or is free from olefinic double bonds. The corresponding explanations given above in connection with the preparation of the polyurethane resins A2b) apply here.

After preparation of the aqueous dispersion of the chain-lengthened polyurethane resin which contains olefinic double bonds or is free from olefinic bonds and contains carboxyl groups, the last synthesis stage in the preparation of the binder dispersion B) is carried out. This is the (meth)acrylation, that is to say the build-up of the polymer content of the polyurethane/poly(meth)acrylate polymer hybrid binder B) by free-radical polymerization by methods known per se. The free-radical polymerization can be a copolymerization or grafting polymerization of the olefinically unsaturated monomers with the or on to the lateral and/or terminal olefinic double bonds of the polyurethane resin, or is a polymerization, which proceeds in the presence of the polyurethane resin which is free from double bonds, of the olefinically unsaturated monomers used for building up the polymer content of the polyurethane/poly(meth) acrylate polymer hybrid binder B), or is a grafting polymerization, initiated by H abstraction from the polyurethane resin which is free from olefinic double bonds, of the olefinically unsaturated monomers used for building up the polymer content of the polyurethane/poly(meth)acrylate polymer hybrid binder B) on to the polyurethane content of the polyurethane/poly(meth)acrylate polymer hybrid binder B). If polyunsaturated monomers are also used in the free-radical polymerization of the olefinically unsaturated monomers, the free-radical polymerization can be carried out such that the polyunsaturated monomers are polymerized incompletely or only a portion of the polyunsaturated monomers are polymerized in, with incomplete consumption of their olefinic double bonds. For example, a portion of the polyunsaturated monomer can be polymerized in with only a portion of their particular unsaturated groups, so that the polymer content of the resulting polyurethane/poly (meth)acrylate polymer hybrid B) can still contain olefinic double bonds.

The free-radical polymerization is carried out, for example, at temperatures of between 20 and 95° C., preferably between 60 and 90° C.

Conventional free radical initiators are suitable, and can be employed in the conventional amounts; examples are peroxide compounds, such as dialkyl peroxides, diacyl peroxides, organic hydroperoxides, per-esters and ketone peroxides; and azo compounds, such as azobisisobutyronitrile. Water-soluble free radical initiators, such as, for example, hydrogen peroxide, ammonium peroxodisulfate and ammonium persulfate, and water-soluble azo initiators are preferred. It is also possible to carry out the polymerization as a redox polymerization using appropriate redox initiator systems, such as, for example sodium sulfite, sodium dithionite, ascorbic acid and peroxide compounds.

In the preparation of the binder dispersions A) and B) containing water-insoluble cellulose esters, polyurethane prepolymers are in each case first prepared. The reaction of the components employed for building up the polyurethane prepolymers is carried out in an anhydrous medium, for example at temperatures of 20 to 140° C., preferably between 50 and 100° C. The reaction can be carried out without a solvent, or it is carried out in organic solvents which are suitable for polyurethane synthesis and are familiar per se to the expert. Water-miscible solvents or water-immiscible solvents can be employed as the solvent. The solvents can be those which can be removed at any stage of the preparation of the binder dispersions A) and B) containing water-insoluble cellulose esters (for example after finishing thereof), for example by distilling off, optionally under reduced pressure. Examples are ketones, e.g. acetone, methyl ethyl ketone and methyl isobutyl ketone; N-alkylpyrrolidones, such as e.g. N-methylpyrrolidone; ethers, such as e.g. diethylene glycol dimethyl ether or dipropylene glycol dimethyl ether, or also cyclic urea derivatives, such as 1,3-dimethyl-3,4,5,6-tetrahydro-2(1H)-pyrimidinone.

The solids content of the polyurethane dispersions A) or polyurethane/poly(meth)acrylate polymer hybrid dispersions B) which comprise water-insoluble cellulose esters and are employed for the preparation of the aqueous coating compositions according to the invention is, for example, between 25 and 65 wt. %, preferably above 35 and below 60 wt. %.

To prepare the aqueous coating compositions according to the invention, pigments are mixed with the aqueous binder dispersions A) and/or B), and optionally with further binders C), crosslinking agents, fillers, conventional lacquer additives and solvents.

In addition to the aqueous binder dispersions A) and/or B), the aqueous coating compositions according to the invention can comprise one or more additional binders C) which differ from these, which also includes paste resins optionally contained in the aqueous coating compositions. The amount of resins C) added can be 0 to 75 wt. % of the total resin solids. In this connection, resin solids means the sum of all the binders A) plus B) plus C) without a crosslinking agent content and without a paste resin content.

Examples of such additional binders C) which differ from A) and B) are the conventional film-forming, water-dilutable binders familiar to the expert, such as water-dilutable polyester resins, water-dilutable poly(meth)acrylate resins or water-dilutable polyester/poly(meth)acrylate hybrids, and water-dilutable polyurethane resins or polyurethane/poly (meth)acrylate hybrids which are free from water-insoluble cellulose esters. The resins C) can be reactive or non-functional resins.

The aqueous coating compositions according to the invention can be self-drying (physically drying) and self-crosslinking or require a crosslinking agent. The aqueous coating compositions according to the invention can accordingly comprise crosslinking agents for binder components A), B) and/or C), such as, for example, amine-formaldehyde condensation resins, e.g. melamine resins, and free or blocked polyisocyanates. The choice of crosslinking agent optionally used depends on the nature of the groups of A), B) and/or C) which are capable of crosslinking and is familiar to the expert. The crosslinking agents can be employed individually or as a mixture. The mixture ratio of crosslinking agents to binders A) plus B) plus C) is preferably 10:90 to 40:60, particularly preferably 20:80 to 30:70, in each case based on the solids weight.

The aqueous coating compositions according to the invention can furthermore comprise lacquer additives, for example rheology-influencing agents, such as highly disperse silica, inorganic laminar silicates, crosslinked or non-crosslinked polymer microparticles, polymeric urea compounds, water-soluble cellulose ethers or synthetic polymers with ionic groups and/or groups which have an associative action; antisettling agents; flow control agents; light stabilizers; catalysts; antifoams; wetting agents; and adhesion promoters.

The aqueous coating compositions according to the invention comprise bases as neutralizing agents for the carboxyl groups of binders A) and B). Examples of bases are amines, preferably tertiary amines. Suitable tertiary amines are e.g. trialkylamines, such as triethylamine; and N-alkylmorpholines, such as N-methylmorpholine. Further examples are amino-alcohols, such as e.g. N-dimethylethanolamine or 2-amino-2-methyl-1-propanol.

The solvent content of the aqueous compositions according to the invention is preferably below 20 wt. %, particularly preferably below 15 wt. %, especially preferably below 10 wt. %. The solvents are conventional lacquer solvents, which can originate from the preparation of the binders or are added separately. Examples of such solvents are mono- or polyhydric alcohols, e.g. propanol, butanol or hexanol; glycol ethers or esters, e.g. diethylene glycol dialkyl ethers, dipropylene glycol dialkyl ethers, each with C1-6-alkyl, ethoxypropanol or butylglycol; glycols, e.g. ethylene glycol, propylene glycol and oligomers thereof, N-alkylpyrrolidones, such as e.g. N-methylpyrrolidone, and ketones, such as methyl ethyl ketone, acetone or cyclohexanone; and aromatic or aliphatic hydrocarbons.

The aqueous coating compositions according to the invention can comprise one or more inorganic and/or organic colour- and/or effect-imparting pigments and optionally additionally at least one filler.

Examples of effect-imparting pigments are metal pigments, e.g. of aluminium, copper or other metals; interference pigments, such as e.g. metal pigments coated with metal oxide, e.g. aluminium coated with titanium dioxide, coated mica, such as e.g. mica coated with titanium dioxide, and graphite effect pigments. Examples of colour-imparting pigments and fillers are titanium dioxide, micronized titanium dioxide, iron oxide pigments, carbon black, silicon dioxide, barium sulfate, micronized mica, talc, kaolin, chalk, azo pigments, phthalocyanine pigments, quinacridone pigments, pyrrolopyrrole pigments and perylene pigments.

The effect pigments are in general initially introduced into the mixing vessel in the form of a commercially available aqueous or non-aqueous paste, preferably water-dilutable, organic solvents and additives are optionally added and the components are then mixed with the aqueous binder. Pulverulent effect pigments can first be processed to a paste with preferably water-dilutable organic solvents and additives. Coloured pigments and/or fillers can be ground, for example, in a portion of the aqueous binder. The grinding can preferably also be effected in a special water-dilutable paste resin. Thereafter, the finished ground coloured pigment composition is completed with the remaining content of the aqueous binder or of the aqueous paste resin.

The aqueous coating compositions according to the invention are preferably water-based lacquers such as are employed for multilayer lacquerings and are overlacquered with transparent clear lacquers. Such a water-based lacquer has, for example, a solids content of 10 to 50 wt. %, and for effect water-based lacquers it is, for example, preferably 15 to 30 wt. %, and for single-coloured water-based lacquers it is preferably higher, for example 20 to 45 wt. %. The ratio of pigment to binder plus optionally crosslinking agent plus optionally paste resin in the water-based lacquer is, for example, between 0.03:1 to 3:1, and for effect water-based lacquers it is, for example, preferably 0.06:1 to 0.6:1 and for single-coloured water based lacquers it is preferably higher, for example 0.06:1 to 2.5:1, in each case based on the solids weight.

The aqueous coating compositions according to the invention are suitable in particular as water-based lacquers for producing the colour- and effect-imparting covering layer within a multilayer lacquering. The water-based lacquers according to the invention can be applied by conventional methods. They are preferably applied by spraying in a dry layer thickness of 8 to 50 μm, and for effect water-based lacquers the dry layer thickness is, for example, preferably 10 to 25 μm and for single-coloured water-based lacquers it is preferably higher, for example 10 to 40 μm. The application is preferably carried out by the wet-in-wet process, i.e. after a solvent evaporation phase, e.g. at 20 to 80° C., the water-based lacquer layers are overlacquered with a clear lacquer in a dry layer thickness of preferably 30 to 60 μm and dried or crosslinked together with this at temperatures of, for example, 20 to 150° C. The drying conditions of the top lacquer layer (water-based lacquer according to the invention and clear lacquer) depend on the clear lacquer system used. For repair purposes, for example, temperatures of 20 to 80° C. are preferred. Temperatures above 100° C., for example above 110° C., are preferred for the purpose of series lacquering.

Clear lacquers which can be employed are both solvent-containing 1- or 2-component clear lacquers, water-dilutable clear lacquers, clear powder coatings, clear powder coating dispersions or clear lacquers which can cure by radiation.

Multilayer lacquerings produced in this way can be applied to the most diverse types of substrates. These are in general substrates of metal or plastic. They are often precoated, i.e. substrates of plastic can be provided e.g. with a plastics primer, metallic substrates in general have an electrophoretically applied primer and optionally additionally one or more further lacquer layers, such as e.g. a filler layer. These layers are in general cured.

Multilayer lacquerings obtained with the water-based lacquers according to the invention meet the current conventional requirements in motor vehicle lacquering. The water-based lacquers according to the invention are thus suitable for first lacquering and repair lacquering of vehicles, but they can also be employed in other fields, e.g. for lacquering plastics, in particular lacquering vehicle components.

The invention furthermore relates to a substrate which is coated with a multilayer coating which has been obtained by application of at least one primer layer, application of a colour- and/or effect-imparting base lacquer layer with an aqueous coating composition according to the invention, optionally drying of the base lacquer layer and application of a transparent coating composition as a top layer and subsequent heating of the coated substrate. Further additional layers can optionally be added to this multilayer lacquering.

In spite of low contents of water-insoluble cellulose esters in the dispersion particles of the binder dispersions A) and/or B) contained in the coating compositions according to the invention, the coating compositions according to the invention have advantageous rheological properties which manifest themselves, for example in the case of the production of effect lacquerings of the effect water-based lacquer/clear lacquer type, in the achievement of an outstanding enhancement of the effect. The storage stability of the aqueous coating compositions according to the invention is good, for example in the sense of favourable settling properties without separation of pigments. The weathering properties of multilayer lacquerings of the base lacquer/clear lacquer type produced from the aqueous coating compositions according to the invention are good.

EXAMPLE 1

Preparation of a Polymer Dispersion a) Preparation of a Carboxy-functional Polymer Containing Epoxide Groups:

100 g of an anhydride mixture (acid number/$H_2O$=486 mg KOH/g), prepared by reaction of trimellitic anhydride with propane-1,2-diol, thus comprising trimellitic anhydride and anhydrides of the following formulae

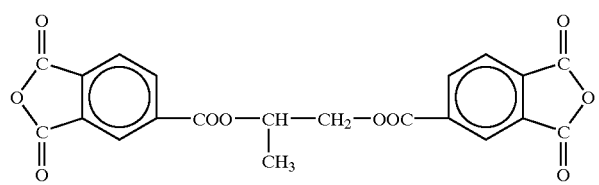

-continued

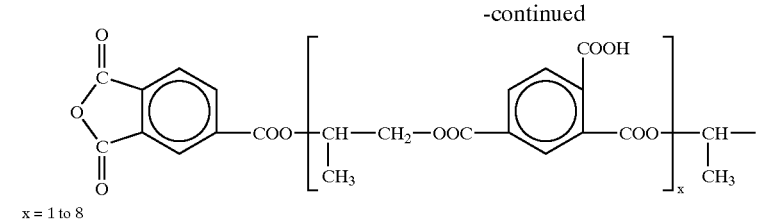

x = 1 to 8 which had been homogenized in 108 g xylene at 50° C., were added dropwise in the course of 1 hour to a solution of 141 g of a polyester (OH number=88 mg KOH/g), prepared on the basis of phthalic anhydride, isophthalic acid, maleic anhydride, propanol and glycerol as described in DE-A 28 11 913, in 70 g methyl ethyl ketone. The reaction mixture was stirred at 90° C. until it had reached an acid number in water of 165 mg KOH/g (100% resin). Thereafter, 12 g water were admixed and, after stirring at 80° C. for 6 hours, an acid number in butanol of 168 mg KOH/g (100% resin) was reached. The mixture temperature was lowered to 60° C. and, after addition of 0.3 g lithium benzoate, 132 g of an epoxidized linseed oil (epoxide number=8.7) were added dropwise in the course of 2 hours and the mixture was stirred until the acid number in butanol had fallen to 86.5. A mixture of 42 g dimethylamine (60% in water) in 860 g water was then stirred in. A pale yellow, opalescent solution was obtained, from which the organic solvent was distilled off under 0.1 bar at 40° C. After filtration, a yellowish practically clear aqueous resin solution was obtained. Solids content: 32 wt. % (1 hour at 125° C.).

b) Preparation of a Polymer Dispersion 705 g of the aqueous (32%) dispersion obtained in a) and 196 g water were introduced into a reactor fitted with a stirrer, reflux condenser, internal thermometer and metering device for the monomers and the initiator. This mixture was heated to 80° C., while stirring, and a solution of 0.5 g ammonium peroxydisulfate in 35 g water was added. 5 minutes after the addition of the initiator, 35 g of a monomer mixture of 125 g methyl methacrylate, 94 g n-butyl acrylate and 17 g glycidyl methacrylate were added, and after prepolymerization for a further 15 minutes, the remaining amount of monomer was metered in over 2 hours. 10 minutes after the addition had ended, a further 0.2 g ammonium peroxydisulfate, dissolved in 10 g water, was added in the course of 10 minutes and the mixture was stirred at 80° C. for a further 2 hours in order to achieve a complete conversion. A stable aqueous dispersion resulted, and was adjusted to a solids content of 40 wt. % with deionized water.

EXAMPLE 2a

Preparation of a Polyurethane Dispersion 1,005 g of a linear polyester (built up from adipic acid, isophthalic acid and hexanediol with an OH number of 102) are heated to 90° C. and 1.8 g trimethylolpropane and 393 g isophorone diisocyanate are added. The reaction is carried out at 90° C. until the NCO number is 3.8. After cooling to 60° C., a solution of 35.3 g dimethylolpropionic acid, 26.1 g triethylamine and 250 g N-methylpyrrolidone is added. After heating to 80° C., this temperature is maintained until an NCO number of 1.5 is reached. The mixture is mixed with the molar amount of deionized water and the solution is kept at 80° C. until NCO is no longer detectable. The mixture is then converted into an aqueous dispersion with a solids content of 30 wt. % by addition of deionized water.

EXAMPLE 2b

Preparation of a Polyurethane Dispersion Comprising a Water-insoluble Cellulose Ester 1,005 g of a linear polyester (built up from adipic acid, isophthalic acid and hexanediol with an OH number of 102) are heated to 90° C. and 1.8 g trimethylolpropane and 393 g isophorone diisocyanate are added. The reaction is carried out at 90° C. until the NCO number is 3.8. After cooling to 60° C., a solution of 35.3 g dimethylolpropionic acid, 26.1 g triethylamine and 150 g N-methylpyrrolidone is added. After heating to 80° C., this temperature is maintained until an NCO number of 1.5 is reached. The mixture is mixed with the molar amount of deionized water and the solution is kept at 80° C. until NCO is no longer detectable. A solution of 36 g cellulose acetobutyrate (acetyl content 2 wt. %, butyryl content 52 wt. %) in 100 g N-methylpyrrolidone is mixed in homogeneously. The mixture is then converted into an aqueous dispersion with a solids content of 30 wt. % by addition of deionized water.

EXAMPLE 3a

Preparation of a Polyurethane Dispersion 339 g of a polyester of adipic acid, hexanediol and isophthalic acid (OH number 104) and 19 g dimethylolpropionic acid are dissolved in 160 g N-methylpyrrolidone and the solution is heated to 40° C. Thereafter, 125 g isophorone diisocyanate are added such that a reaction temperature of 80° C. is not exceeded. This temperature is maintained until an NCO content of 2% (based on the solid resin), determined in accordance with DIN 53 185, is reached. Thereafter, 14.6 g 3-aminopropyltriethoxysilane and 16.2 g diethanolamine are added in succession. The reaction mixture is kept at 80° C. until free NCO groups are no longer detectable (titration). For neutralization, a mixture of 12.6 g triethylamine and 12.6 g deionized water is added and incorporated thoroughly. The mixture is then converted into an aqueous dispersion with a solids content of 30 wt. % by addition of deionized water.

EXAMPLE 3b

Preparation of a Polyurethane Dispersion Comprising a Water-insoluble Cellulose Ester 339 g of a polyester of adipic acid, hexanediol and isophthalic acid (OH number 104) and 19 g dimethylolpropionic acid are dissolved in 100 g N-methylpyrrolidone and the solution is heated to 40° C. Thereafter, 125 g isophorone diisocyanate are added such that a reaction temperature of 80° C. is not exceeded. This temperature is maintained until an NCO content of 2% (based on the solid resin), determined in accordance with DIN 53 185, is reached. Thereafter, 14.6 g 3-aminopropyltriethoxysilane and 16.2 g diethanolamine are added in succession. The reaction mixture is kept at 80°

C. until free NCO groups are no longer detectable (titration). A solution of 21 g cellulose acetobutyrate (acetyl content 2 wt. %, butyryl content 52 wt. %) in 60 g N-methylpyrrolidone is mixed in homogeneously. For neutralization, a mixture of 12.6 g triethylamine and 12.6 g deionized water are added and incorporated thoroughly. The mixture is then converted into an aqueous dispersion with a solids content of 30 wt. % by addition of deionized water.

EXAMPLE 4a

Preparation of a Dispersion of a Methacrylated Polyurethane Resin 145.4 g of a polyester of adipic acid, neopentylglycol and isophthalic acid (OH number: 109 mg KOH/g) and 8.0 g dimethylolpropionic acid are dissolved in 69.6 g N-methylpyrrolidone and the solution is heated to 40° C. Thereafter, 55.8 g isophorone diisocyanate are added such that a reaction temperature of 80° C. is not exceeded. The mixture is kept at this temperature until an NCO content of 2% (based on the solid resin and determined in accordance with DIN 53185) is reached. Thereafter, 3.3 g diethanolamine, 12.2 g dodecanol and 2.0 g hydroxyethyl methacrylate are added in succession. The reaction mixture is kept at 80° C. until free NCO groups are no longer detectable (titration). 128.0 g methyl methacrylate are then added. 5.4 g triethylamine and 5.4 g deionized water are added and incorporated thoroughly. After addition of 864.0 g deionized water, a finely divided aqueous dispersion is obtained. 250.0 g butyl acrylate, 125.0 g tert-butyl acrylate and a solution of 62.0 g deionized water and 2.0 g ammonium peroxodisulfate are now added continuously at 80° C. over 2 h. The mixture is then kept for 3 h at 80° C. and adjusted to a solids content of 30 wt. % with deionized water.

EXAMPLE 4b

Preparation of a Dispersion of a Methacrylated Polyurethane Resin Comprising a Water-insoluble Cellulose Ester 145.4 g of a polyester of adipic acid, neopentylglycol and isophthalic acid (OH number: 109 mg KOH/g) and 8.0 g dimethylolpropionic acid are dissolved in 69.6 g N-methylpyrrolidone and the solution is heated to 40° C. Thereafter, 55.8 g isophorone diisocyanate are added such that a reaction temperature of 80° C. is not exceeded. The mixture is kept at this temperature until an NCO content of 2% (based on the solid resin and determined in accordance with DIN 53185) is reached. Thereafter, 3.3 g diethanolamine, 12.2 g dodecanol and 2.0 g hydroxyethyl methacrylate are added in succession. The reaction mixture is kept at 80° C. until free NCO groups are no longer detectable (titration). A solution of 29 g cellulose acetobutyrate (acetyl content 2 wt. %, butyryl content 52 wt. %) in 128 g methyl methacrylate is mixed in homogeneously. 5.4 g triethylamine and 5.4 g deionized water are added and incorporated thoroughly. After addition of 864.0 g deionized water, a finely divided aqueous dispersion is obtained. 250.0 g butyl acrylate, 125.0 g tert-butyl acrylate and a solution of 62.0 g deionized water and 2.0 g ammonium peroxodisulfate are now added continuously at 80° C. over 2 h. The mixture is then kept for 3 h at 80° C. and adjusted to a solids content of 30 wt. % with deionized water.

EXAMPLE 5

Preparation of an Aluminium Paste 20.5 g of a commercially available aluminium paste (metal content 65%) are stirred thoroughly with a mixture of 7.0 g butoxyethanol and 14.0 g deionized water. 4.0 g of the binder dispersion from example 1 and 6.0 g of the binder dispersion from example 2a, 10.0 g butoxyethanol, 34.7 g deionized water and 3.0 g of a commercially available polyacrylic acid thickener (solids content 8 wt. %) are then admixed. The mixture is brought to a pH of 6.3 with dimethylethanolamine.

EXAMPLE 6

Preparation of an Aqueous Laminar Silicate Dispersion 3 parts of a laminar silicate (Optigel SH from Südchemie) are sprinkled into a mixture of 40 parts of deionized water and 10 parts of butylglycol which has been initially introduced into the mixing vessel and are dispersed under a dissolver at the highest sower level. Thereafter, 40 parts of melamine resin of the hexamethoxymethylmelamine type and 7 parts of deionized water are mixed in homogeneously.

EXAMPLE 7a—f

Preparation of Water-based Lacquers

EXAMPLE 7a

Comparison

A water-based lacquer (green metallic) is prepared by homogeneous mixing of the following constituents:
19 parts of the 40 wt. % aqueous polymer dispersion from example 1,
17 parts of the 30 wt. % aqueous polyurethane dispersion from example 2a,
28 parts of deionized water,
8 parts of polyacrylic acid thickener (adjusted to pH 7.5 with dimethylethanolamine, solids content 8 wt. %),
5 parts of a green ground pigment composition according to EP-B-0 581 211, preparation example 10 (pigment content 20 wt. % of a chlorinated phthalocyanine pigment),
4 parts of the aluminium paste from example 5,
3 parts of the aqueous laminar silicate dispersion from example 6,
9 parts of butylglycol,
0.5 part of a commercially available defoamer based on acetylenediol,
1 part of polypropylene glycol (hydroxyl number 125 mg KOH/g),
5.5 parts of deionized water.

200 g of the water-based lacquer (adjusted to an initial viscosity of 35 seconds, AK4) were introduced into a 250 ml screw-capped jar and kept closed at 40° C. for 4 weeks. After the storage, the AK4 viscosity was 49 seconds.

100 ml of the water-based lacquer were introduced into a 100 ml standing cylinder and stored closed at 20° C. for 1 week. After one week, 3 ml of supernatant liquid had formed.

EXAMPLE 7b

Comparison

Example 7a is repeated, with the difference that instead of 17 parts of the polyurethane dispersion from example 2a, 17 parts of the polyurethane dispersion from example 3a are used.

The AK4 viscosity rose from 35 seconds to 45 seconds after storage at 40° C. for 4 weeks. 3 ml of supernatant liquid formed in the standing cylinder.

EXAMPLE 7c

According to the Invention

Example 7a is repeated, with the difference that instead of 17 parts of the polyurethane dispersion from example 2a, 17 parts of the polyurethane dispersion from example 2b comprising a water-insoluble cellulose ester are used.

The AK4 viscosity rose from 35 seconds to 42 seconds after storage at 40° C. for 4 weeks.

No supernatant liquid formed in the standing cylinder.

EXAMPLE 7d

According to the Invention

Example 7a is repeated, with the difference that instead of 17 parts of the polyurethane dispersion from example 2a, 17parts of the polyurethane dispersion from example 3b comprising a water-insoluble cellulose ester are used.

The AK4 viscosity rose from 35 seconds to 42 seconds after storage at 40° C. for 4 weeks.

No supernatant liquid formed in the standing cylinder.

EXAMPLE 7e

Comparison water-based lacquer (green metallic) is prepared by homogeneous mixing of the following constituents:
12.3 parts of the 40 wt. % aqueous polymer dispersion from example 1,
26 parts of the 30 wt. % aqueous dispersion of a methacrylated polyurethane resin from example 4a,
25.7 parts of deionized water,
8 parts of polyacrylic acid thickener (adjusted to pH 7.5 with dimethylethanolamine, solids content 8 wt. %),
5 parts of a green ground pigment composition according to EP-B-0 581 211, preparation example 10 (pigment content 20 wt. % of a chlorinated phthalocyanine pigment),
4 parts of the aluminium paste from example 5,
3 parts of the aqueous laminar silicate dispersion from example 6,
9 parts of butylglycol,
0.5 part of a commercially available defoamer based on acetylenediol,
1 part of polypropylene glycol (hydroxyl number 125 mg KOH/g),
5.5 parts of deionized water.

200 g of the water-based lacquer (adjusted to an initial viscosity of 35 seconds, AK4) were introduced into a 250 ml screw-capped jar and kept closed at 40° C. for 4 weeks. After the storage, the AK4 viscosity was 57 seconds.

100 ml of the water-based lacquer were introduced into a 100 ml standing cylinder and stored closed at 20° C. for 1 week. After one week, 1 ml of supernatant liquid had formed.

EXAMPLE 7f

According to the Invention

Example 7e is repeated, with the difference that instead of 26 parts of the aqueous dispersion of a methacrylated polyurethane resin from example 4a, 26 parts of the aqueous dispersion of a methacrylated polyurethane resin from example 4b comprising a water-insoluble cellulose ester are used.

The AK4 viscosity rose from 35 seconds to 50 seconds after storage at 40° C. for 4 weeks.

No supernatant liquid formed in the standing cylinder.

EXAMPLE 8a—f

Production of Base Lacquer/clear Lacquer Two-layer Lacquerings

The water-based lacquers from example 7a—f are each applied by spraying in a dry layer thickness of 16 $\mu$m on to a conventional phosphated sheet of vehicle body metal precoated by cathodic dip-lacquering and with filler. After a solvent evaporation time of 5 min at 80° C., the metal is overlacquered by compressed air spraying in a dry layer thickness of 40 $\mu$m with a commercially available two-component polyurethane clear lacquer and stoved for 20 min at 140° C. (object temperature).

The two-layer lacquerings obtained were subjected to a 2,000-hour accelerated weathering (VDA 621-430 (E), Weather-O-meter, apparatus: WOM-Sunshine). They were then investigated for cracking in accordance with the TNO standard. Cracking was observed on none of the lacquerings.

The metallic effect formation was determined using the Micrometallic$^R$ measuring instrument marketed by BYK-Gardner by measuring the brightness L*25°(brightness in the L*,a*,b* colour dimension, measured under an angle of 25 degrees to the gloss): lacquering 8a, 84; lacquering 8b, 85; lacquering 8c, 86; lacquering 8d, 87; lacquering 8e, 84; lacquering 8f, 87.

What is claimed is:

1. A method of applying multilayers of lacquer to a substrate comprising:
    (a) applying to a substrate a base lacquer layer from a water-borne base lacquer comprising an aqueous binder dispersion of at least one polyurethane resin, said resin optionally being (meth)acrylated, wherein the aqueous binder dispersion comprises 0.5 to 5 wt % of at least one water-insoluble cellulose ester; and
    (b) applying a clear lacquer layer to the base lacquer layer.

2. The method of claim 1, wherein the aqueous binder dispersion is prepared by a process comprising the sequential steps of:
    (a) mixing at least one water-insoluble cellulose ester with at least one polyurethane resin, said resin optionally being (meth)acrylated; and
    (b) adding an effective amount of water to convert the mixture of step (a) into an aqueous dispersion.

3. The method of claim 1, wherein the aqueous binder dispersion is prepared by a process comprising the sequential steps of:
    (a) mixing at least one water-insoluble cellulose ester with at least one polyurethane resin;
    (b) (meth)acrylating the at least one polyurethane resin; and
    (c) adding an effective amount of water to form an aqueous dispersion.

4. The method of claim 1, wherein the aqueous binder dispersion is prepared by a process comprising the sequential steps of:
    (a) mixing at least one polyurethane resin in a non-aqueous phase with at least one water-insoluble cellulose ester;
    (b) converting the mixture into an aqueous dispersed phase by adding an effective amount of water; and
    (c) (meth)acrylating the at least one polyurethane resin.

5. A method of applying multilayers of lacquer to a substrate comprising:

(a) applying to a substrate a base lacquer layer from a water-borne base lacquer comprising an aqueous binder dispersion of at least one polyurethane resin, wherein the aqueous binder dispersion comprises 0.5 to 5 wt % of at least one water-insoluble cellulose ester; and (b) applying a clear lacquer layer to the base lacquer layer; wherein the aqueous binder dispersion is prepared by a process comprising the sequential steps of:

(1) mixing at least one water-insoluble cellulose ester with at least one polyurethane resin;

(2) (meth)acrylating the at least one polyurethane resin; and (3) adding an effective amount of water to form an aqueous dispersion.

6. A method of applying multilayers of lacquer to a substrate comprising:

(a) applying to a substrate a base lacquer layer from a water-borne base lacquer comprising an aqueous binder dispersion of at least one polyurethane resin, wherein the aqueous binder dispersion comprises 0.5 to 5 wt % of at least one water-insoluble cellulose ester; and (c) applying a clear lacquer layer to the base lacquer layer; wherein the aqueous binder dispersion is prepared by a process comprising the sequential steps of:

(1) mixing at least one polyurethane resin in a non-aqueous phase with at least one water-insoluble cellulose ester;

(2) converting the mixture into an aqueous dispersed phase by adding an effective amount of water; and (3) (meth)acrylating the at least one polyurethane resin.

* * * * *

UNITED STATES PATENT AND TRADEMARK OFFICE
CERTIFICATE OF CORRECTION

PATENT NO.    : 6,811,825 B1
DATED         : November 2, 2004
INVENTOR(S)   : Werner Bosch et al.

Page 1 of 1

It is certified that error appears in the above-identified patent and that said Letters Patent is hereby corrected as shown below:

Column 5,
Line 43, -- 10 -- to be inserted between "perferably" and "to 40"

Column 6,
Line 55, "R'" should be replaced with -- R" --

Column 7,
Line 64, -- bridges (-Si-O-Si) bonded in the polyurethane part. For. -- to be inserted between "siloxane" and "this"

Column 17,
Line 12, "xylerie" to be replaced with -- xylene --

Column 20,
Line 17, "sower" to be replaced with -- power --

Column 21,
Line 27, "water-based" to be replaced with -- A water-based --

Signed and Sealed this

Nineteenth Day of April, 2005

JON W. DUDAS
*Director of the United States Patent and Trademark Office*